Oct. 5, 1926.
L. BLACKMORE
1,601,844
MOUNTING MEANS FOR INDICIA BEARING MEMBERS
Filed April 20, 1925
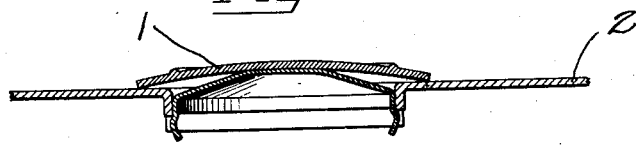
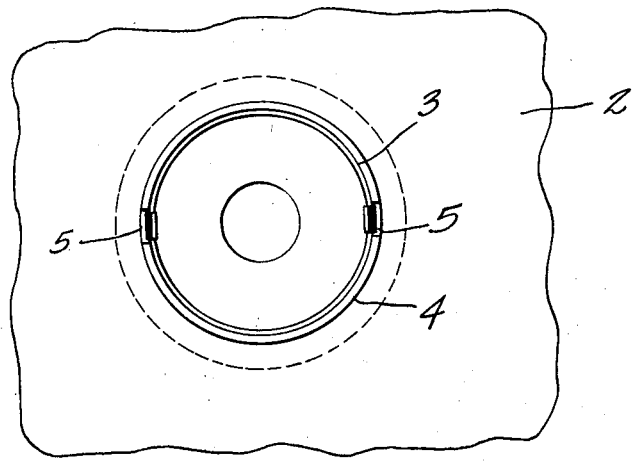
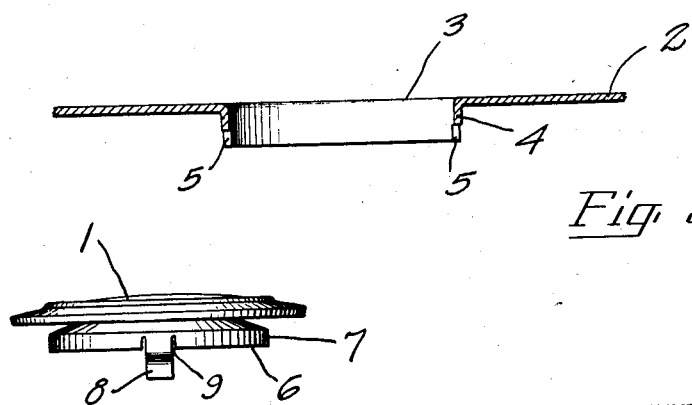
INVENTOR Patented Oct. 5, 1926.

1,601,844

UNITED STATES PATENT OFFICE.

LLOYD BLACKMORE, OF HIGHLAND PARK, MICHIGAN, ASSIGNOR TO GENERAL MOTORS CORPORATION, OF DETROIT, MICHIGAN, A CORPORATION OF DELAWARE.

MOUNTING MEANS FOR INDICIA-BEARING MEMBERS.

Application filed April 20, 1925. Serial No. 24,641.

This invention relates to mounting means for indicia bearing members.

One object of this invention is to provide a mounting means which will effectively hold the indicia bearing member in position against accidental dislodgment and, if desired, against rotation as well.

It is a further object of my invention to provide such a mounting or securing means in combination with guide means for the indicia bearing member which will hold it securely in non-rattling engagement with the support, the joint between said guide means and said support being preferably substantially impervious to the entrance of dirt or moisture. My invention also has within its purview the provision of such a securing means which will be concealed from view so as not to detract from the appearance of the object in connection with which it is used.

It is also an object of my invention to so construct the mounting or securing means as to permit rapidity of assembly, an object of great importance in automobile work for which this invention is specifically designed.

Referring now to the drawing:

Figure 1 is a sectional view of my indicia bearing member shown in assembled relation with its support;

Figure 2 is a rear elevation of the said assembly;

Figure 3 is a section through the supporting member; while

Figure 4 is a side elevation of the indicia bearing member and its mounting or securing means.

The indicia bearing member is indicated by the reference character 1. This member may carry any desired inscription and may be mounted upon any suitable support. However, I have made particular use of the construction of my invention in mounting name plates upon automobile radiator shells, and the support indicated at 2 may be regarded as a portion of the front member of such shell. This support is provided with an opening 3 and it will be observed that around said opening the edges of the metal or other material of which the member 2 is constructed are inturned as at 4. The inturned portion 4 is preferably provided with spaced notches 5, the purpose of which will be hereinafter stated.

The means for securing the indicia bearing member in position comprises a member 6 preferably separately formed and fastened to the member 1 as by soldering or welding. The member 6 has cooperation with the opening 3 in the support 2, and comprises a guiding means or portion and securing or holding means, although it is not essential that it be adapted to perform both these functions. The guiding portion is constituted by a flange 7 formed on the member 6 and conforming in shape to the opening 3, thereby effecting a tight, non-rattling joint constituting a seal which prevents the entrance of moisture and dirt into the radiator shell. The securing or holding means preferably comprises spring arms 8, said arms, in the form shown, being formed as continuations of the flange 7, although this is not essential. The flange 7 is incised as at 9 at the base of said arms in order that they may have the desired resiliency. The arms 8 are adapted for engagement with the notches 5 to hold the member 1 against accidental dislodgment as well as against rotation with respect to the support 2.

In assembling this device the indicia bearing member 1 is so positioned that the arms 8 project into the opening 3, these arms preferably being inclined inwardly at their outer ends so as to facilitate this preliminary engagement. The member 1 is then thrust forcibly into its mounted position. It is not necessary that the arms 8 be originally carefully alined with the notches 5 since if these parts are out of alinement it is merely necessary to slightly rotate the indicia bearing member 1 until the said arms spring into the notches whereupon the parts are securely engaged against any possibility of accidental withdrawal or relative rotation.

While I have shown and described one specific embodiment of my inventive idea, it is obvious that this idea is capable of application in other relations and in the construction of devices of varied form, all of which I regard as within the scope of my invention provided they fall within the terms of the claims hereto appended.

What I claim is:

1. The combination of a support having an opening therein, the edges of said opening being notched at spaced points, an indicia bearing member, and resilient means secured to said member and adapted to seat in said notches whereby said member is held against withdrawal as well as against rotation.

2. The combination of a support having an opening therein, and having the edges around said opening inturned, said inturned edges being provided with spaced notches, an indicia bearing member, and spaced spring arms secured to said member and adapted to engage the said notches for securing said member in position.

3. The combination of a support having an opening therein and having the edges around said opening inturned, said inturned edges being provided with spaced notches, an indicia bearing member having a cylindrical guiding surface for engagement with said inturned edges and spaced spring arms extending from said member and adapted to engage the said notches for securing the member in position as well as against rotation.

4. The combination of a support having an opening therein and having the edges around said opening inturned, said inturned edges being provided with spaced notches, an indicia bearing member having a cylindrical guiding surface for engagement with said inturned edges, spaced spring arms formed on said guiding surfaces and extending rearwardly therefrom, said arms being adapted to engage the said notches for securing the member in position.

In testimony whereof I affix my signature.

LLOYD BLACKMORE.